3,234,151
**POLYETHERS OF LACTOSITOL AND POLY-
URETHANE COMPOSITIONS THEREFROM**
George J. Stockburger, Philadelphia, Pa., and Leon W. Wright, Wilmington, and John D. Brandner, Arden, Wilmington, Del., assignors to Atlas Chemical Industries, Inc., Wilmington, Del., a corporation of Delaware
No Drawing. Filed Oct. 19, 1959, Ser. No. 847,078
5 Claims. (Cl. 260—2.5)

This invention relates to polyurethane compositions and to novel polymer compounds suitable for the preparation of such compositions. More particularly, it relates to polyoxyproplyene ethers of lactositol and to foamed polyurethane compositions employing said ethers as essential components thereof.

Polymeric compositions containing a plurality of urethane groups constitute a class of plastic materials of major importance. They are made by reacting an organic compound containing a plurality of isocyanate groups, suitably a di- or tri-isocyanate with a polyhydroxy compound. If, during the reaction, a gas is generated in the reacting mixture, the resulting plastic product will be cellular in structure and such products are known as polyurethane foams. The physical properties of the resulting foam are dependent on a number of factors which include the functionality of the reactants, i.e., the number of reactive groups per mol of each, the molecular structure of the reactants, the ratio of hydroxyl to isocyanate groups employed, the nature of the gas generated in the reacting mass, the rate at which it is evolved during the reaction, and the like.

Suitable organic polyisocyanates for use in forming the polyurethane compositions of the invention are well known in the art and include aliphatic and aromatic di- and tri-isocyanates. Among such may be named m- and p-phenylene diisocyanates; the tolylene diisocyanates; p,p'-diphenyl diisocyanate; 1,5-naphthylene diisocyanate; p,p'-diphenylmethane diisocyanate; toluene triisocyanate; diphenyl ether triisocyanate; hexamethylene diisocyanate and trimethylene diisocyanate. Preferred polyisocyanates are the arylene diisocyanates particularly the tolylene diisocyanates.

Prior art polyhydroxy compounds employed in the formation of polyurethane compositions have included, among others, hydroxyl terminated polyester resins, castor oil, polyalkylene glycols and hydroxyl bearing polyethers of tri-, tetra- and hexahydric alcohols. These latter have been prepared, in general, by reacting an alkylene oxide, preferably propylene oxide, with monomeric polyhydric alcohols bearing the indicated number of hydroxyl groups.

In accordance with the present invention there are provided novel polyhydroxy compounds and polyurethane compositions formed therefrom which compounds contain nine hydroxyl groups per mol and are condensation products of lactositol with a plurality of molar proportions of propylene oxide.

Lactositol is the trivial or common name of the nonahydric alcohol obtained by the reduction of lactose under nonhydrolyzing conditions. Its proper chemical designation is 4-O-β-D-galactosyl-D-glucitol. By condensing one molar proportion of lactositol with from 2 to 100 molar proportions of propylene oxide, under nonhydrolyzing conditions and employing techniques well known in the art of condensing alkylene oxide with hydroxy compounds, the novel polyoxypropylene ethers of the invention are obtained.

A preferred group of ethers are those containing up to 20 oxypropylene groups per mol. The condensation reaction is preferably carried out at elevated temperature and pressure and, if desired, in the presence of a catalyst. Alkaline materials such as the alkali metal hydroxides, alkali metal alcoholates are particularly suitable catalysts. Acidic catalysts and/or reaction media are to be avoided lest the lactositol be hydrolyzed and the high functionality of the resulting polyether be diminished.

Anhydrous lactositol is a high melting solid and for convenience of handling in the reactor may advantageously be admixed with a minor proportion, i.e., up to 20% by weight, of water. The addition of propylene oxide to mixtures of lactositol and water result in the formation of mixtures of polypropylene glycols with polyoxypropylene ethers of lactositol which mixtures are the functional equivalent of the polyoxypropylene ethers per se.

The following nonlimiting examples are illustrative of the preparation of polyoxypropylene ethers of lactositol in accordance with the invention.

*Example I*

200 grams of powdered lactositol containing 9.66% by weight of water and melting at 81–86° C. and 1.0 gram of powdered potassium hydroxide were charged into a stainless steel autoclave of one liter capacity. The autoclave was flushed with nitrogen and the charge brought to a temperature of 130° C. 545 grams of propylene oxide were then introduced in increments over a period of 3.75 hours while slowly raising the temperature to 152° C. When the propylene oxide was all added, the charge was held at temperature until all the propylene oxide had reacted as evidenced by no further decrease in pressure in the system. The charge was cooled and neutralized with phosphoric acid to a pH of 6.8, heated to 100° C. for a half hour under vacuum (1 mm.) and then agitated at 100° C. with magnesium silicate under an atmosphere of nitrogen. The filtered product, a mixture of polypropylene glycols and polyoxypropylene ethers of lactositol was a syrupy liquid exhibiting a hydroxyl number of 466 and an ash content (sulfated) of 0.005%.

*Example II*

279 grams of lactositol (percent $H_2O=0.15$, melting point=152–153° C.), 3.0 grams of powdered potassium hydroxide and 5.5 grams of water were charged into an autoclave and condensed with 740 grams of propylene oxide following the procedure described in Example I. The polyoxypropylene ether condensate was a liquid of moderate viscosity having a hydroxyl number of 468 and an ash (sulfated) content of 0.06%.

Polyurethane compositions in accordance with the invention are produced by condensing polyisocyanates, preferably diisocyanates, with the polyoxypropylene ethers of lactositol described and exemplified above. The resulting condensates are highly cross-linked by virtue of the high functionality of the ether and range in physical characteristics from very hard resins when ethers of low oxypropylene content are employed to very tough abrasion-resistant compositions when ethers of higher oxypropylene content are employed. They are chemically stable and are useful in the preparation of rigid castings or shaped elastomeric articles such as gaskets, as adhesives and in coating compositions. They are particularly suited to the formation of rigid, semi-rigid and flexible polyurethane foams, produced by causing the condensation reaction between a polyoxypropylene lactositol ether and a polyisocyanate to take place under conditions such that a gas is generated in the reacting mass. The gas may be generated by a chemical reaction as, for example, by employing an excess of isocyanate over that required to react with the hydroxyls of the ether and incorporating water in the reaction mixture. Alternatively, a liquid which vaporizes at the temperature of reaction may be dispersed in the reaction mixture when the reaction components are brought together.

The formation of foamed polyurethane compositions in accordance with the invention is illustrated in the following examples.

*Example III*

A prepolymer containing 4.5 isocyanate radicals per hydroxyl group is first prepared by admixing in an inert atmosphere, 391.5 grams of a commercial tolylene diisocyanate and 120 grams of the product of Example I. An exothermic reaction occurs and the temperature is not permitted to rise above 70° C. The charge is held at 70° C. for 30 minutes by which time the exothermic effect has subsided and the resulting syrupy prepolymer is allowed to cool. It is used to prepare a rigid foam as follows:

In one vessel 2.5 grams of a polysiloxane surface-active agent (X 520 Silicone) are mixed for two minutes with 255.5 grams of the prepolymer. In a separate vessel, 75 grams of trichlorofluoromethane (Freon II) 2 grams of triethylene diamine catalyst are mixed for two minutes with 210 grams of the polyoxypropylene condensate product of Example I. The contents of the two vessels are combined, mixed rapidly for 30 seconds and poured into a mold. Foaming commences almost immediately and is complete in 5 minutes. The surface is tack-free in 7 minutes and the foam is hard after 10 minutes.

A foam prepared in accordance with the foregoing instructions was found to be hard and white and of uniform cell size. Physical testing yielded the following data:

| | |
|---|---|
| Density lbs./ft.$^3$ | 2.42 |
| Compressive strength at— | |
| 10% compression lbs./in.$^2$ | 42.0 |
| 25% compression lbs./in.$^2$ | 48.0 |
| 50% compression lbs./in.$^2$ | 48.25 |
| Porosity | |
| Closed cells percent | 89.93 |
| Cell wall do | 3.91 |
| Open cells do | 6.10 |

The foam is suitable for a wide variety of uses such, for example, as in insulation for refrigerators, trucks or house walls, as void fillers in aircraft, boats or other structure where light weight rigid foams are desired.

Polyoxypropylene ethers of lactositol containing higher proportions of reacted propylene oxide yield flexible foams suitable for use in crash pads, seating material, packaging liners, sponges, paint applicators, and the like. A flexible foam may be prepared as follows:

*Example IV*

Prepare a prepolymer by reacting 73 parts by weight of the polyoxypropylene ether of lactositol containing 100 oxypropylene groups per mol with 27 grams of tolylene diisocyanate for 2 hours at 70° C.

To the prepolymer so-formed add 0.5 gram of a polysiloxane surfactant and stir in rapidly a mixture of 2.0 grams water and 2.0 grams of N-methyl morpholine as catalyst. Pour the mixture into a mold of the desired shape and allow it to foam.

What is claimed is:

1. A polyoxypropylene ether of lactositol wherein the number of oxypropylene groups per mol is from 2 to 100.

2. A polyoxypropylene ether of lactositol wherein the number of oxypropylene groups per mol is from 2 to 20.

3. The mixed polyoxypropylene ethers obtained by condensation reaction, under nonhydrolyzing conditions and at elevated temperature and pressure, of from 2 to 100 molar proportions of propylene oxide with one molar proportion of lactositol in admixture with a minor proportion of water.

4. A polyurethane composition consisting essentially of the reaction product of a polyisocyanate selected from the group consisting of aliphatic and aromatic di- and tri-isocyanates and a polyoxypropylene ether of lactositol wherein the number of oxypropylene groups per mol of ether is from 2 to 100.

5. A polyurethane composition consisting essentially of the reaction product of a polyisocyanate selected from the group consisting of aliphatic and aromatic di- and tri-isocyanates and the mixed polyoxypropylene ether composition obtained by condensation reaction, under nonhydrolyzing conditions, between from 2 to 100 molar proportions of propylene oxide and one molar proportion of lactositol in admixture with a minor proportion of water.

References Cited by the Examiner

UNITED STATES PATENTS

| | | | |
|---|---|---|---|
| 2,574,544 | 11/1951 | De Groote | 260—615 |
| 2,698,838 | 1/1955 | Simon et al. | 260—77.5 |
| 2,772,245 | 11/1956 | Simon et al. | 260—77.5 |
| 2,802,795 | 8/1957 | Simon et al. | 260—77.5 |
| 2,819,260 | 1/1958 | Monson et al. | 260—209 |
| 2,889,883 | 6/1959 | Santora | 260—77.5 |
| 2,902,478 | 9/1959 | Anderson | 260—77.5 |
| 2,990,376 | 6/1961 | Brassler et al. | 260—2.5 |
| 3,042,666 | 7/1962 | Gentles | 260—77.5 |
| 3,085,085 | 4/1963 | Wismer et al. | 260—209 |

OTHER REFERENCES

Wilson et al., Science, vol. 128, page 1343, Nov. 28, 1958.

Wolfrom et al., J. Amer. Chem. Soc., vol. 60, pages 571–3, 1938.

LEON J. BERCOVITZ, *Primary Examiner*.

MILTON STERMAN, HAROLD N. BURSTEIN, JOSEPH R. LIBERMAN, *Examiners*.